Patented Sept. 20, 1938

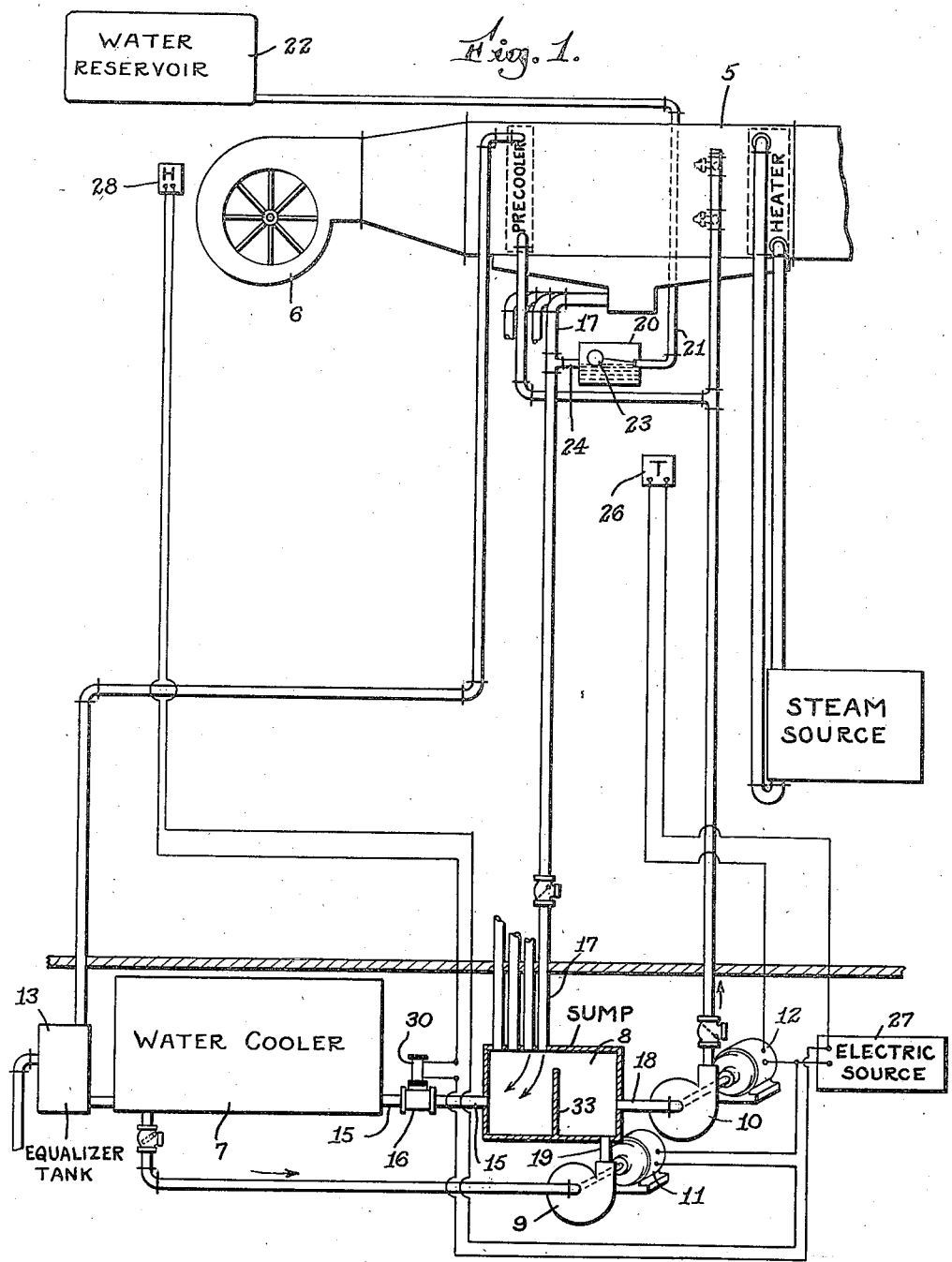

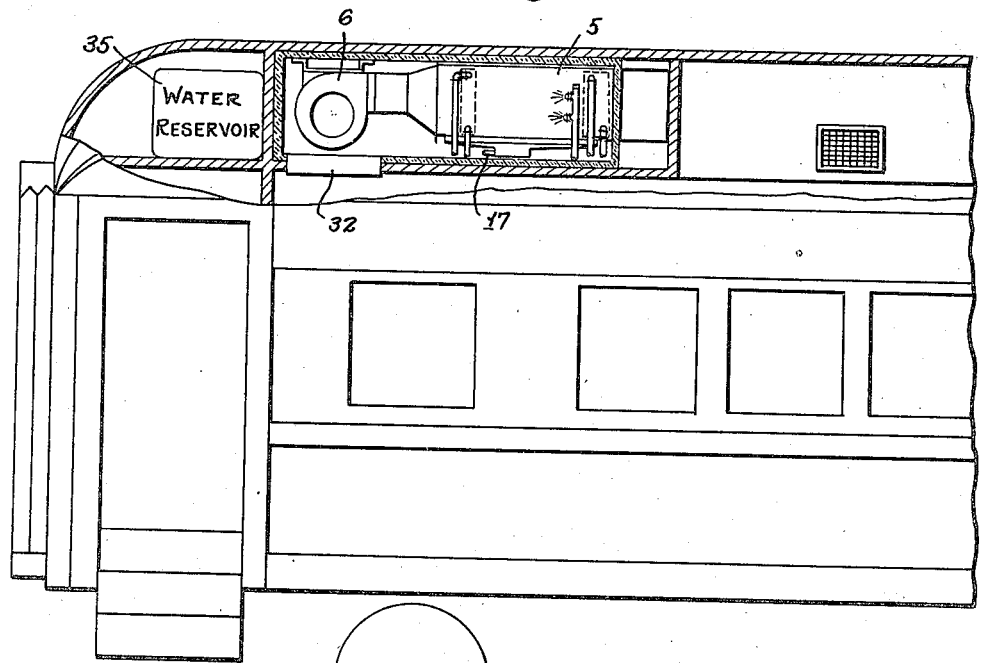
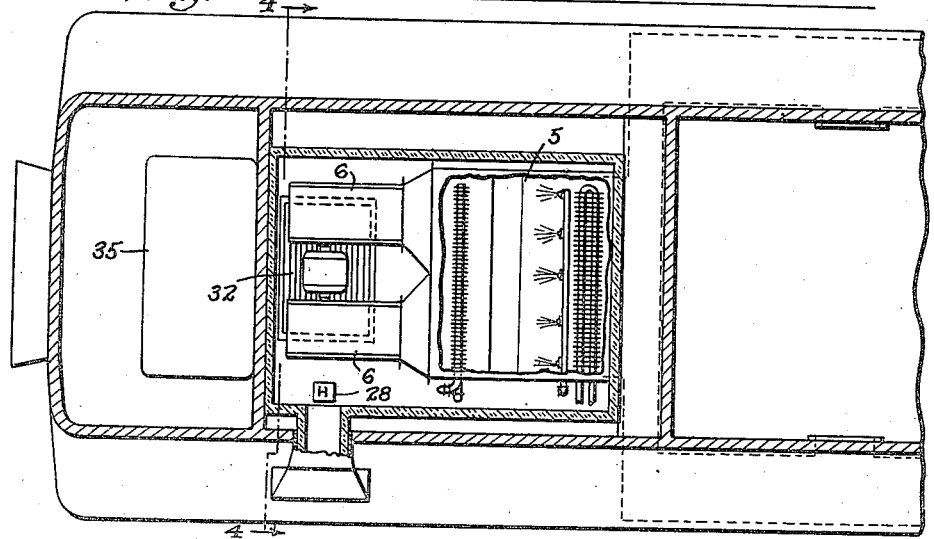
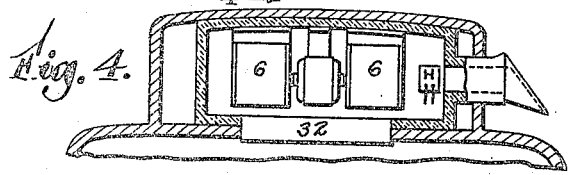

2,130,479

UNITED STATES PATENT OFFICE 2,130,479

AIR CONDITIONING SYSTEM

Samuel M. Anderson, Sharon, Mass., assignor to B. F. Sturtevant Company, Boston, Mass.

Application May 11, 1937, Serial No. 141,959

12 Claims. (Cl. 62—6)

This invention relates to air conditioning systems and relates more particularly to air conditioning systems for passenger vehicles.

In my co-pending application, Serial No. 107,019, filed October 22, 1936, there is disclosed a spray type cooling system for a railway passenger car, convertible from evaporative cooling to cooling by refrigeration, and in which the air cooler is located in the upper part of the car, while the refrigeration apparatus is located on the under side of the car. The present invention is an improvement over that set forth in said application and provides in some respects, a more efficient system in that less power for operation is required. This invention is not, however, in some respects limited to a spray system.

According to a feature of this invention, the "head" of the liquid in the liquid return line or lines from the overhead air cooler to the lower liquid cooler is utilized for aiding in the supply of liquid from the liquid cooler to the air cooler.

According to another feature of this invention, the system is convertible from an evaporative cooling cycle to a refrigerative cooling cycle, through the use of two pumps, one of which operates during both cycles and one of which operates during the refrigerative cooling cycle with a resulting saving of power during the evaporative cooling cycle.

According to another feature of the invention, the air washer, and outside air passage into the system are so insulated that the condition of the air entering the system is that of the outside air, unchanged by any sun effect, etc. so that evaporative cooling may be more effectively employed when the wet bulb temperature of the outside air is sufficiently low.

An object of the invention is to effectively cool the air supplied to a passenger vehicle.

Another object of the invention is to save power in cooling the air in a passenger vehicle by utilizing the energy in the liquid returned from the air cooler to the water cooler.

Other objects of the invention will be apparent from the following description taken together with the drawings.

The invention will now be described with reference to the drawings of which:

Fig. 1 is a diagrammatic view of one embodiment of a complete air conditioning system according to this invention;

Fig. 2 is a side view illustrating the location of the air cooling unit, its associated blowers, and the outside air passage in an insulated compartment in the upper part of a railway passenger car;

Fig. 3 is an enlarged plan view looking downwardly upon the apparatus of Fig. 2; and Fig. 4 is a transverse section along the lines 4—4 of Fig. 3.

The air washer indicated generally by 5, and its associated blower 6 may be identical with those described in my said application and so will not be described in detail here. They are mounted in the upper part of the railway passenger car, as shown by Fig. 2 of the drawings.

On the under side of the car are arranged the water cooler 7, a water sump 8, the pumps 9 and 10 and their driving motors 11 and 12. The equalizer tank 13 may also be provided. The water cooler 7 may be of the type disclosed in my Patent 2,020,093, in which water is maintained at a uniform level and is circulated around the base of ice cakes. The water cooler 7 is connected by the pipe 15 and the electrically controlled valve 16 to the sump 8. During the refrigerative cooling cycle, the valve 16 is opened, with the result that the same water level is maintained in the sump 8, the water cooler 7 and the equalizer tank 13.

The sump 8 is connected also to the water return pipes 17 from the air washer 5, to the suction pipe 18 of the pump 10 and to the discharge pipe 19 of the pump 9. Otherwise, it is completely sealed and is designed to maintain a pressure therein, equal to the pressure head of the water in the water return pipes 17. The water return pipes 17 are approximately 10 feet long each, with the result that when full of water, a 10 ft. water head is maintained within the sump 8. This water head is utilized, as will be explained in the following, for aiding in supplying the water from the sump 8 to the spray nozzles in the air washer 5.

Some of the water in the system is evaporated during the evaporative cooling cycle and according to another feature of this invention, make-up water is added to the system by a float controlled valve which feeds water into the water return pipes from the washer just underneath the washer. The return pipes from the washer may thus be kept substantially full of water at all times. The make-up water tank 22 may be mounted in the upper part of the car as illustrated by Figs. 1 and 2. It is connnected by the pipe 21 to the float chamber 20. The float operated valve 23 admits water into one or more of the pipes 17 through one or more pipes 24. It is preferred that the float chamber and its connection into the pipe 17 be arranged as close to the washer 5 as structural limitations will permit.

The system is designed to operate when the wet bulb temperature of the outside air is below a predetermined point, in an evaporative cooling cycle. When the wet bulb temperature of the outside air is above a predetermined point, the system operates in a refrigerative cooling cycle. The pump 10 which draws water from the sump 8 and forces it to the spray nozzles in the air washer 5, operates intermittently under control of the car thermostat 26 during both the evaporative and refrigerative cooling cycles. The thermostat 26, when the temperature within the passenger space has reached a predetermined low point, opens the energizing circuit from the electric source 27 of the driving motor 12 of the pump 10, causing the pump 10 to shut down and thus discontinue the supply of cooling water to the air washer 5.

The pump 9 operates only during the refrigerative cooling cycle. When the wet bulb temperature of the outside air is above, say 60° F., the hygrostat 28 mounted in the fresh air inlet, closes the energizing circuit from the electric source 27 to the electric motor 11 driving the pump 9 and at the same time energizes the solenoid 30 of the valve 16 causing an orifice in the valve 16 to open to permit the flow of water from the sump 8 to the water cooler 7.

The pump 9, of course, has to overcome the 10 ft. head which is maintained in the sump 8, but this pump operates intermittently and when it is not operating less power is required for the pump 10 than were the usual water circulation system provided. This results during the evaporative cooling cycle, in the pump 10 requiring less energy through being aided by the water head within the sump 8, than has been previously possible.

The baffle wall 33 extends from the floor of the sump 8 to a point adjacent its upper wall. The return pipes 17 from the washer 5, discharge into the sump 8 at a point to the left (facing Fig. 1 of the drawings). When both pumps are operating, there is a tendency for the water returned through the pipes 17 to leave the sump through the pipe 18 without passing through the water cooler 7. The baffle wall overcomes this tendency by directing the water towards the pipe 15 to the water cooler.

When systems such as the one disclosed in my said application were operated in an evaporative cooling cycle in the ordinary railway passenger car, it was found that most efficient operation was not achieved for the reason that the outside air entering the air washer was changed in condition on its way to the washer.

According to this invention, the passageway leading from the outside air into the car is insulated and the air washers and blowers are also insulated against the addition of heat by the insulating layers 34 of insulation, so that the condition of the outside air entering the air washer is not changed by the always present sun effect, heat losses from the car, and recirculated air infiltration. In previous installations, when the wet bulb temperature of the outdoor air was 60°, this temperature was increased to 63° or 64° by the time the air reached the washer. This resulted in the washer water being cooled to only 63° or 64° but according to the present invention, the washer water is cooled to the wet bulb temperature of the outside air.

The apparatus disclosed, includes the recirculated air inlet opening 32 but as explained in my said application, when the system is operated in the evaporative cooling cycle, only outside air is admitted and means is provided for closing dampers in the recirculated air inlet opening. During the refrigerative cooling cycle, recirculated air is admitted as disclosed in said application.

While one embodiment of the invention has been described for the purpose of illustration, it should be understood that the invention is not limited to the exact arrangement described, as many departures and modifications will suggest themselves to those skilled in the art, after having had access to this disclosure.

What is claimed is:

1. An air conditioning system for a passenger vehicle comprising an air cooler, a liquid cooler mounted underneath said air cooler, a liquid sump, a pump connected to said sump and said air cooler for drawing liquid from said sump and for forcing it to said air cooler, and a second pump connected to said water cooler and said sump for drawing liquid from said water cooler and for forcing it into said sump.

2. An air conditioning system for a passenger vehicle comprising an air cooler, a liquid cooler mounted underneath said air cooler, a liquid sump, a pump connected to said sump and said air cooler for drawing liquid from said sump and for forcing it to said air cooler, a second pump connected to said water cooler and said sump for drawing liquid from said water cooler and for forcing it into said sump, and means for returning the liquid from said air cooler to said sump.

3. An air conditioning system for a passenger vehicle comprising an air cooler, a liquid cooler mounted underneath said air cooler, a liquid sump, a pump connected to said sump and said air cooler for drawing liquid from said sump and for forcing it to said air cooler, a second pump connected to said water cooler and said sump for drawing liquid from said water cooler and for forcing it into said sump, and means responsive to changes in the wet bulb temperature of the outside air entering said air cooler for controlling said second pump.

4. An air conditioning system for a passenger vehicle comprising an air cooler, a liquid cooler mounted underneath said air cooler, a liquid sump, a pump connected to said sump and said air cooler for drawing liquid from said sump and for forcing it to said air cooler, a second pump connected to said water cooler and said sump for drawing liquid from said water cooler and for forcing it into said sump, means for returning the liquid from said air cooler to said sump, and means responsive to changes in the wet bulb temperature of the outside air entering said air cooler for controlling said second pump.

5. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, and a pipe connecting said air cooler and said sump for returning liquid from said air cooler to said sump, said sump and said liquid cooler being sealed from the atmosphere whereby the liquid in said pipe maintains a pressure head in said sump.

6. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, a pipe connecting said air cooler and said sump for returning liquid from said air cooler to said sump, said sump and said liquid cooler being sealed from the atmosphere whereby the liquid in said pipe maintains a pressure head in said sump, and means for closing off the connection between said liquid cooler and said sump whereby said system may operate in an evaporative cooling cycle through recirculation of the liquid between said air cooler and said sump.

7. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, a pipe connecting said air cooler and said sump for returning liquid from said air cooler to said sump, said sump and said liquid cooler being sealed from the atmosphere whereby the liquid in said pipe maintains a pressure head in said sump, means for closing off the connection between said liquid cooler and said sump, and means responsive to changes in the wet bulb temperature of the outside air entering said air cooler for controlling said last mentioned means.

8. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, a pipe connecting said air cooler and said sump for returning liquid from said air cooler to said sump, said sump and said liquid cooler being sealed from the atmosphere whereby the liquid in said pipe maintains a pressure head in said sump, and a second pump connected to said liquid cooler and said sump for drawing liquid from said liquid cooler and for forcing it into said sump.

9. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, a pipe connecting said air cooler and said sump for returning liquid from said air cooler to said sump, said sump and said liquid cooler being sealed from the atmosphere whereby the liquid in said pipe maintains a pressure head in said sump, a second pump connected to said liquid cooler and said sump for drawing liquid from said liquid cooler and for forcing it into said sump, and means responsive to changes in the wet bulb temperature of the outside air entering said air cooler for controlling said pump.

10. An air conditioning system for a passenger vehicle comprising an air cooler, a liquid cooler mounted underneath said air cooler, a liquid sump adjacent said liquid cooler and connected thereto, a pump connected to said sump and said air cooler for forcing liquid from said sump to said air cooler, a pipe connecting said air cooler and said sump for returning liquid from said air cooler to said sump, said sump and said liquid cooler being sealed from the atmosphere whereby the liquid in said pipe maintains a pressure head in said sump, a valve for closing off the connection between said sump and said liquid cooler, a second pump connected to said liquid cooler and said sump for drawing liquid from said liquid cooler and for forcing it into said sump, and means responsive to changes in the wet bulb temperature of the outside air entering said air cooler for controlling said pump, and for controlling said valve.

11. An air conditioning system for a passenger vehicle comprising an air washer, means forming an outside air passage into said washer, walls of thermal insulation around said washer and said passage and separating same from the walls of said vehicle, a water sump, means for recirculating water between said sump and said washer, a water cooler, means for circulating water between said sump and said cooler, and a wet bulb thermostat mounted in said passage for controlling said last mentioned means.

12. An air conditioning system for a passenger vehicle comprising an air cooler, a liquid cooler underneath said air cooler, means forming a liquid sump, a pump connected to said air cooler, means forming a water outlet in said sump, a pipe connecting said outlet and the suction side of said pump, a water cooler, means forming a second water outlet in said sump, a pipe connecting said second outlet with said water cooler, means forming a water inlet in the upper portion of said sump, a pipe connecting said inlet with said air cooler, and a baffle wall within said sump between said inlet and said first mentioned outlet.

SAMUEL M. ANDERSON.